US006792439B2

(12) United States Patent
Schmidt

(10) Patent No.: US 6,792,439 B2
(45) Date of Patent: Sep. 14, 2004

(54) METHOD AND APPARATUS FOR GENERATING RANDOM NUMBERS WITH IMPROVED STATISTICAL PROPERTIES

(75) Inventor: Douglas Charles Schmidt, Severna Park, MD (US)

(73) Assignee: Science Applications International Corp., San Diego, CA (US)

( * ) Notice: Subject to any disclaimer, the term of this patent is extended or adjusted under 35 U.S.C. 154(b) by 587 days.

(21) Appl. No.: 09/833,962

(22) Filed: Apr. 13, 2001

(65) Prior Publication Data

US 2003/0065691 A1 Apr. 3, 2003

(51) Int. Cl.[7] ................................................. G06F 1/02
(52) U.S. Cl. ....................................................... 708/250
(58) Field of Search ............................... 708/250–256

(56) References Cited

U.S. PATENT DOCUMENTS 6,061,702 A * 5/2000 Hoffman ..................... 705/251
6,317,686 B1 * 11/2001 Ran .......................... 701/210
6,539,410 B1 * 3/2003 Klass ......................... 705/255
6,678,707 B1 * 1/2004 Butler ........................ 708/250

* cited by examiner

Primary Examiner—D. H. Malzahn
(74) Attorney, Agent, or Firm—Banner & Witcoff, Ltd.

(57) ABSTRACT

A method and an apparatus are provided for combining a plurality of random number generators into a combined random number generator. The outputs of the plurality of generators are interleaved into a combined stream of random numbers selected from each of the plurality of random-number generators. A value of x is calculated by each of the random number generators. Each of the values of x is mapped to a respective arrival time t for each of the random number generators. One of the random number generators having an earliest respective arrival time t is determined. A random number based on the arrival time t is generated.

56 Claims, 7 Drawing Sheets

METHOD AND APPARATUS FOR GENERATING RANDOM NUMBERS WITH IMPROVED STATISTICAL PROPERTIES

FIELD OF THE INVENTION

Aspects of the invention pertain to pseudo-random number generators. In particular, aspects of the invention relate to combining a plurality of pseudo-random number generators into a combined pseudo-random number generator, such that the combined pseudo-random number generator has better statistical properties than its constituent pseudo-random number generators.

BACKGROUND OF THE INVENTION

Random number generators and pseudo-random number generators have many practical applications, such as for encrypting digital computer messages and for performing simulations. Pseudo-random number generators are generally constructed using an algorithm that, in some cases, can be inferred by observing the output over a period of time.

Attempts have been made to combine pseudo-random number generators; however, such attempts have typically yielded a combined pseudo-random number generator having worse statistical properties than its constituent components. For example, one prior art combined pseudo-random number generator uses a first pseudo-random number generator to populate a table of numbers, such as, one hundred numbers or a thousand numbers, or any quantity of numbers. A second pseudo-random number generator is used to generate indexes to the table populated by the first pseudo-random number generator. As numbers are selected from the table of numbers, the used entries are replenished by numbers generated by the first pseudo-random number generator. Using such a technique, a combined random number generator with a very large cycle is produced; however, the combined pseudo-random number generator has worse statistical properties than the constituent pseudo-random number generators. For example, there may be more correlation among the random numbers produced by the combined pseudo-random number generator than among the random numbers produced by its constituent parts, or the combined pseudo-random number generator may tend to have more repeated patterns than the numbers produced by its constituent parts.

Consequently, there is a need to provide a random-number generator having improved statistical properties to meet the need for improved encryption and simulation among other things.

SUMMARY OF THE INVENTION

A method and an apparatus are provided for combining a plurality of random number generators into a combined random number generator. The outputs of the plurality of generators are interleaved into a combined stream of random numbers selected from each of the plurality of random-number generators. A value of x is calculated by each of the random number generators. Each of the values of x is mapped to a respective arrival time t for each of the random number generators. One of the random number generators having an earliest respective arrival time t is determined. A random number based on the arrival time t is generated.

DETAILED DESCRIPTION OF THE INVENTION

Queuing theorists and traffic engineers typically base analysis on an assumption that arrivals of events are distributed according to a Poisson process in time. This reflects the fact that not only is the mathematics involved particularly manageable, but also the assumption often reflects reality. Typically, when many traffic streams are mixed, a resulting stream is assumed to conform to the Poisson distribution. This fact has been used for models regarding telecommunications, vehicular traffic, faults in a system, and so forth. The present invention applies similar techniques to create a random number generator.

Figure 1:
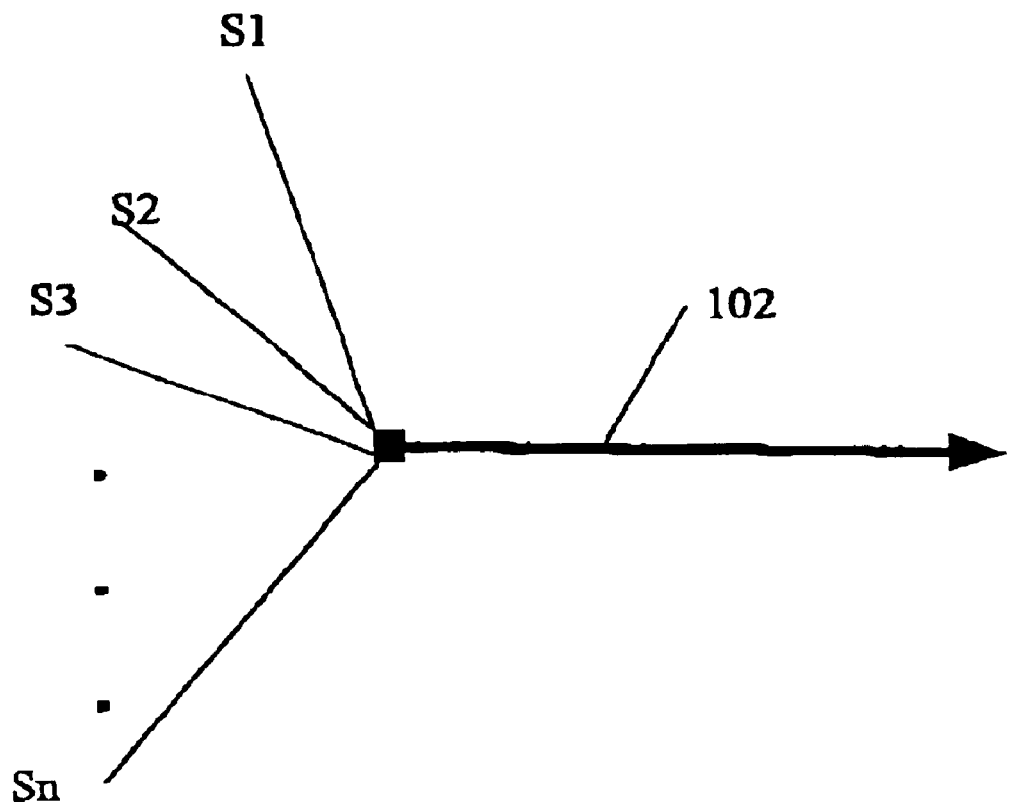
FIG. 1 shows an example of a prior art mixing of traffic streams.

FIG. 1 shows an example of this mixing of many traffic streams. Here, n independent event streams or traffic streams, S1–Sn, merge into a common stream 102. The resulting stream conforms more to a Poisson distribution as a value of n increases. When the inter-arrival times for the individual streams conform to Poisson distributions, the inter-arrival time of the combined stream 102 is Poisson for all n streams. When the inter-arrival times of the individual streams nearly conform to the Poisson distribution, the inter-arrival time of the resulting stream becomes Poisson distributed for a small value of n.

An embodiment of the combined pseudo-random number generator (CPRNG) approximates Poisson streams using individual independent pseudo-random number generators (PRNGs) which are combined to form a closely approximate Poisson stream. Uniformly distributed random numbers are then extracted from the stream.

There are many ways of expressing Poisson arrivals. One way of expressing Poisson arrivals is in terms of the distribution of inter-arrival times, that is, the times between successive arrivals. For example, using a Poisson process, the probability p of having t seconds between adjacent arrivals is:

$$p = \lambda e^{-\lambda t} \qquad \text{[EQUATION 1]}$$

where $\lambda$ is an average arrival rate.

Figure 2:
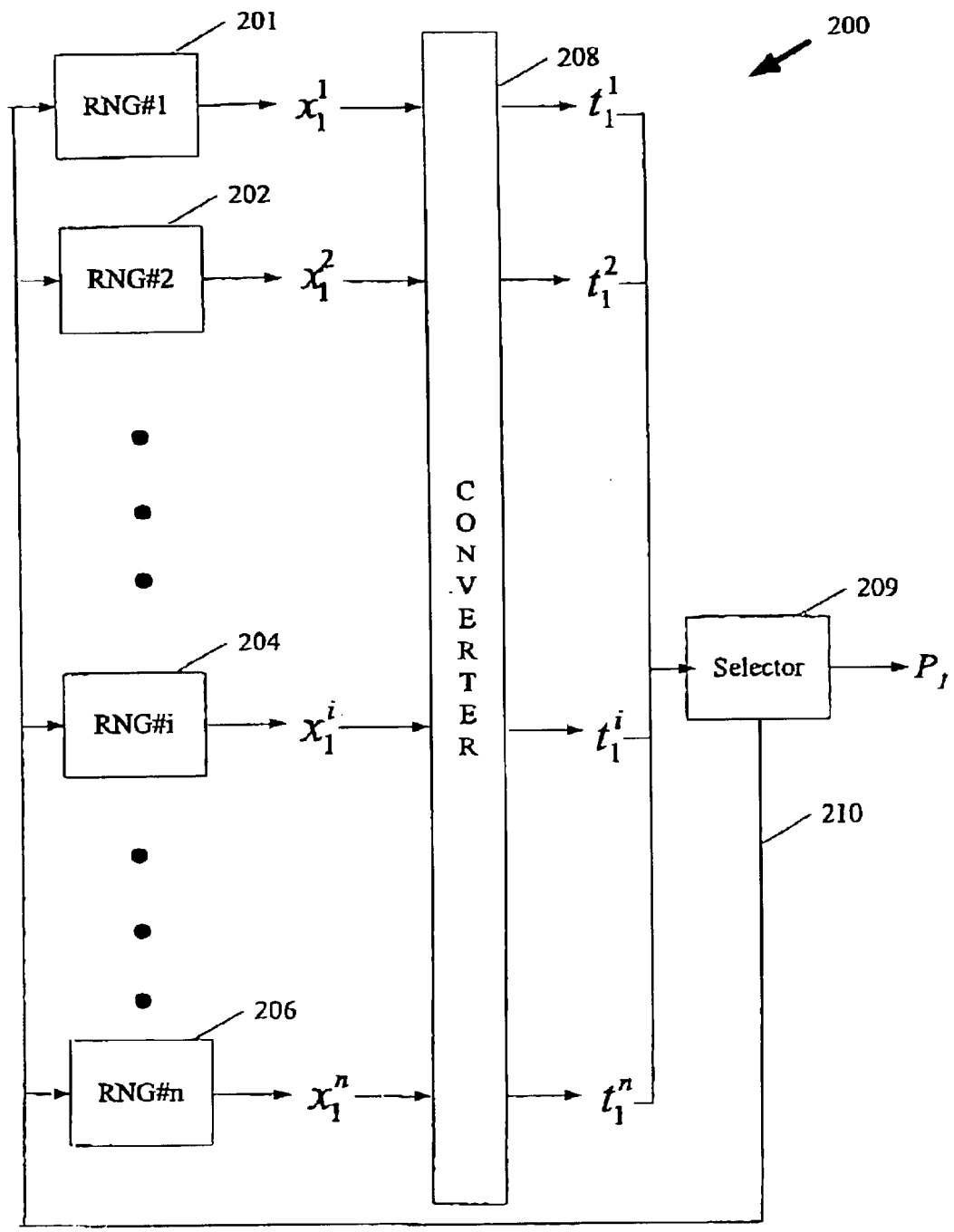
FIGS. 2 through 4 illustrate an embodiment of the invention forming a combined random number generator from n constituent random number generators.

FIG. 2 illustrates an embodiment of the invention 200 in which n random number generators (RNG's) 201, 202, 204, 206 each generate a respective value of x. FIG. 2 shows each random number generator generating its first respective value of x. RNG#1 generates $x_1^1$, the first value of x for RNG#1, RNG#2 generates $x_1^2$, the first value of x for the RNG#2, RNG#i generates $x_1^i$, the first value of x for RNG#i, and so on, until all n random number generators have generated a respective value of x.

Each respective value of x is input to a respective converter 208 which converts a value of each respective x to a next arrival time. For example $x_1^1$ is converted to $t_1^1$, a first arrival time for RNG#1, $x_1^2$ is converted to $t_1^2$, a first arrival time for RNG#2, $x_1^i$, is converted to $t_1^i$, a first arrival time for RNG#i, and so on.

Selector 209 then determines which one of the arrival times, t's, is an earliest arrival time. The earliest arrival time is selected from among the arrival times. If two or more arrival times, t's, are equal, but less than all other arrival times, then any of the equal arrival times may be selected. Selector 209 then generates a random number P based on the earliest arrival time. FIG. 2 shows $P_1$, the first random number generated by the CPRNG. Selector 209, via line 210, then causes the random number generator which had generated the selected earliest arrival time, to generate a next value of x. For example, if RNG#i had generated the earliest arrival time based on the first respective value of x, $x_1^i$, RNG#i will be caused to generate the second respective value of x, $x_2^i$, which will then be converted by converter 208 to a second arrival time, $t_2^i$, for RNG#i. The selector then would examine the arrival times to determine the next earliest arrival time to produce $P_2$, the second random number from the CPRNG. The process continues until a desired number of random numbers, P's, have been generated.

Figure 3:
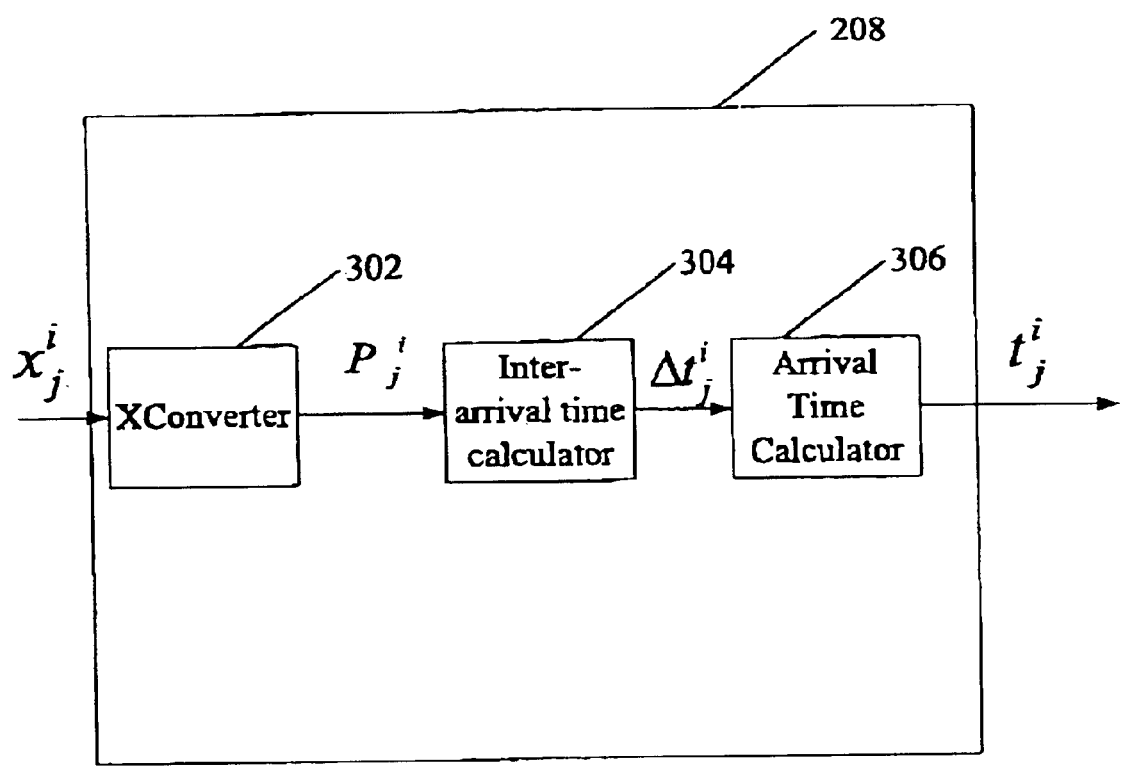

FIG. 3 illustrates a more detailed view of one embodiment of converter 208. A value of x, for example, $x_j^i$, the $j^{th}$ value from the $i^{th}$ random number generator, RNG#I, is received as input to xconverter 302 which converts $x_j^i$ to a probability number, for example, $P_j^i$, the $j^{th}$ probability number from the $i^{th}$ random number generator, such that $0<P_j^i \leq 1$. Inter-arrival time calculator 304 converts the probability number, for example, $P_j^i$, to an inter-arrival time, for example, the $j^{th}$ inter-arrival time for the $i^{th}$ random number generator, $\Delta t_j^i$. Arrival time calculator then converts the inter-arrival time to a next arrival time, for example $t_j^i$, the $j^{th}$ arrival time for the $i^{th}$ random number generator. The basis on which the various calculations can be made is explained later herein.

Figure 4:
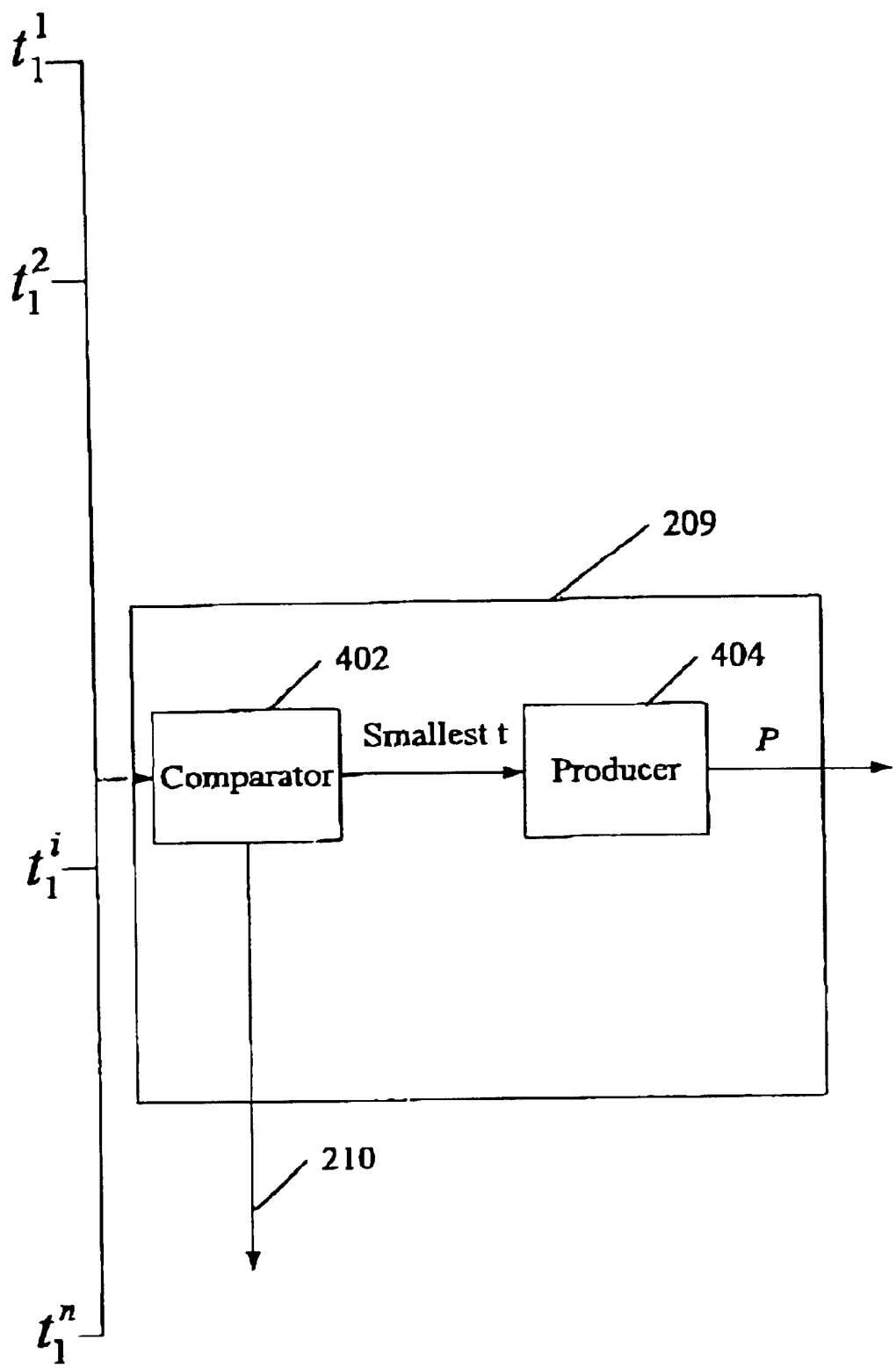

FIG. 4 illustrates a more detailed view of selector 209. Selector 209 receives as input all of the next arrival times, t's. Comparator 402 compares the next arrival times, and selects an earliest next arrival time (the smallest t). The comparator, via line 210, then causes the random number generator associated with the smallest arrival time to generate a next respective x. The comparator also passes the smallest next arrival time t to producer 404 to produce the next random number output from the CPRNG, for example, $P_i$, the $i^{th}$ random number produced by the CPRNG.

Referring again to FIG. 2, assume that the inter-arrival time of each of the n streams of random numbers from each uniformly distributed PRNG is independent of the n-1 other PRNG's generating inter-arrival times. Considering stream i, a corresponding PRNG, RNG#i, generates its $j^{th}$ pseudo-random integer $x_j^i$, which is in a range from 0 to $c_i$, where $c_i$ is a maximum value generated by RNG#i. XConverter 302, shown in FIG. 3, within converter 208, converts $x_j^i$ to a probability number, for example, $P_j^i$, which is in a range such that $0<P_j^i \leq 1$. The conversion may be performed according to the following formula:

$$P_j^i = \frac{(x_j^i + 1)}{(c_i + 1)} \quad \text{[EQUATION 2]}$$

$P_j^i$ is converted to an inter-arrival time, for example, $\Delta t_j^i$ by inter-arrival time calculator 304 using an Inverse Cumulative Distribution Function (ICDF) for inter-arrival times. The ICDF can be determined by the following equation:

$$\Delta t_j^i = \frac{-\ln(P_j^i)}{\lambda_i} = \frac{-\ln\left(\frac{(x_j^i + 1)}{(c^i + 1)}\right)}{\lambda_i} \quad \text{[EQUATION 3]}$$

where $\lambda_i$ is an average arrival rate for random stream i and $\Delta t_j^i$ is an inter-arrival time for the $j^{th}$ inter-arrival on stream i.

Arrival time calculator 306 calculates a next arrival time by adding a previous arrival time associated with the random number generator to the inter-arrival time, $\Delta t_j^i$ to calculate a next arrival time. For example, $t_j^i$, the $j^{th}$ arrival time associated with the $i^{th}$ random number generator, RNG#i, can be calculated by adding the previous arrival time, $t_{j-1}^i$ to inter-arrival time $\Delta t_j^i$.

In other words, the $j^{th}$ arrival time on stream i is $$t_j^i = t_{j-1}^i + \Delta t_j^i = t_0^i + \sum_{k=1}^{i} \Delta t_k^j \quad \text{[EQUATION 4]}$$

At any given time T, the next arrival in the combined stream will occur at $t_i$ indicating that there have been i−1 arrivals on the combined stream prior to $t_i$. The $i^{th}$ inter-arrival time for the combined stream, $\Delta t_i = t_i - t_{i-1}$ which can be converted into a uniformly distributed probability $P_i$ by using a Cumulative Distribution Function (CDF) for an exponential distribution:

$$P_i = e^{-\left(\sum_{j=1}^{n} \lambda_j\right) \Delta t_i} \quad \text{[EQUATION 5]}$$

Producer 404 calculates the $i_{th}$ probability for the combined stream, $P_i$, based on Equation 5, where $\lambda_j$ is the average inter-arrival rate for the $j_{th}$ stream and $\Delta t_i$, is the inter-arrival time for the $i_{th}$ stream. $\Delta t_i$, can be derived by:

$$\Delta t_i = t_i - t_{i-1} \quad \text{[EQUATION 6]}$$

In other words, the $i_{th}$ inter-arrival time for the combined stream is equal to the ($i_{th}$−1) arrival time subtracted from the $i_{th}$ arrival time.

Given the smoothing properties when traffic streams are combined, the combined stream will more closely approximate a Poisson distribution than do the individual constituent streams. As a result, the P's corresponding to the Poisson process in the combined stream have superior and more uniform randomness than the values of $P_j^i$ generated by the constituent PRNG's.

Figure 5A:
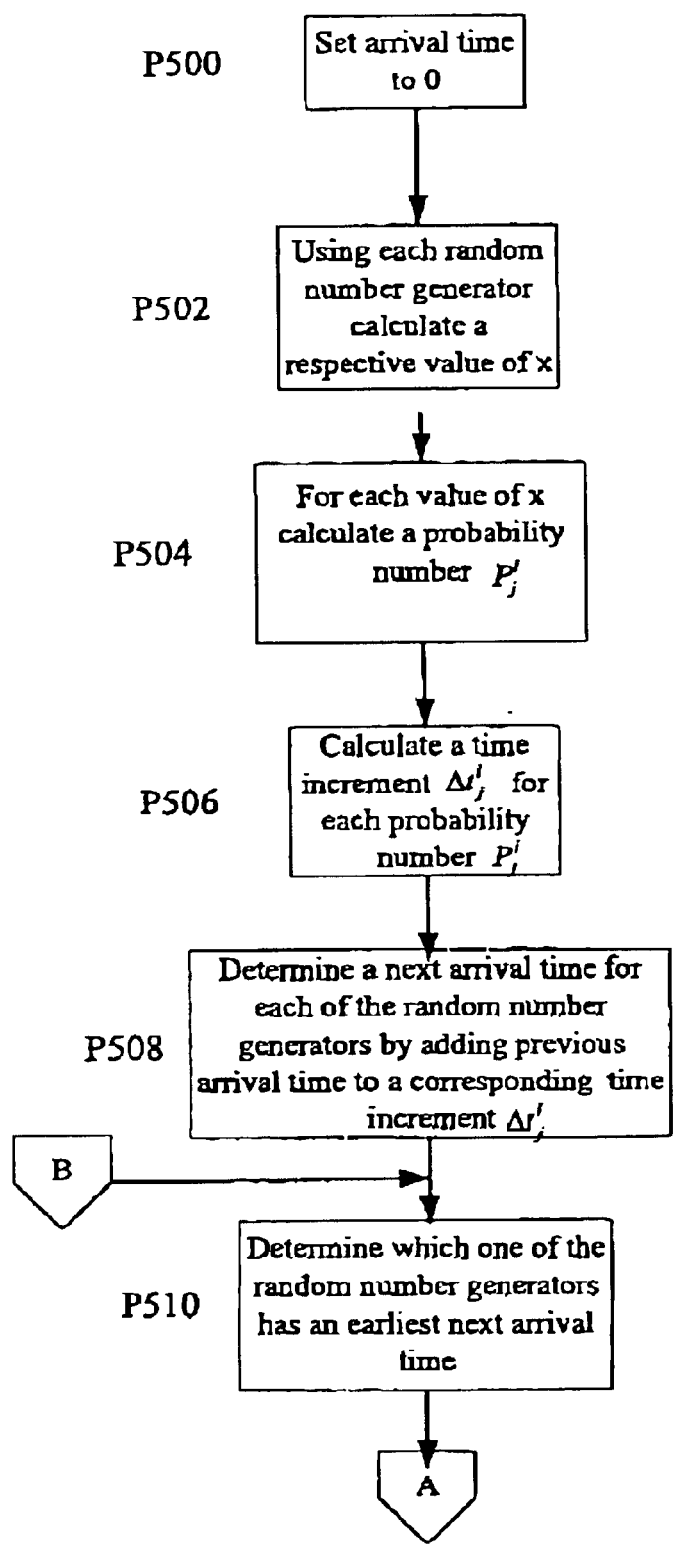
FIGS. 5A and 5B are a flowchart for explaining processing in an embodiment of the invention.
Figure 5B:
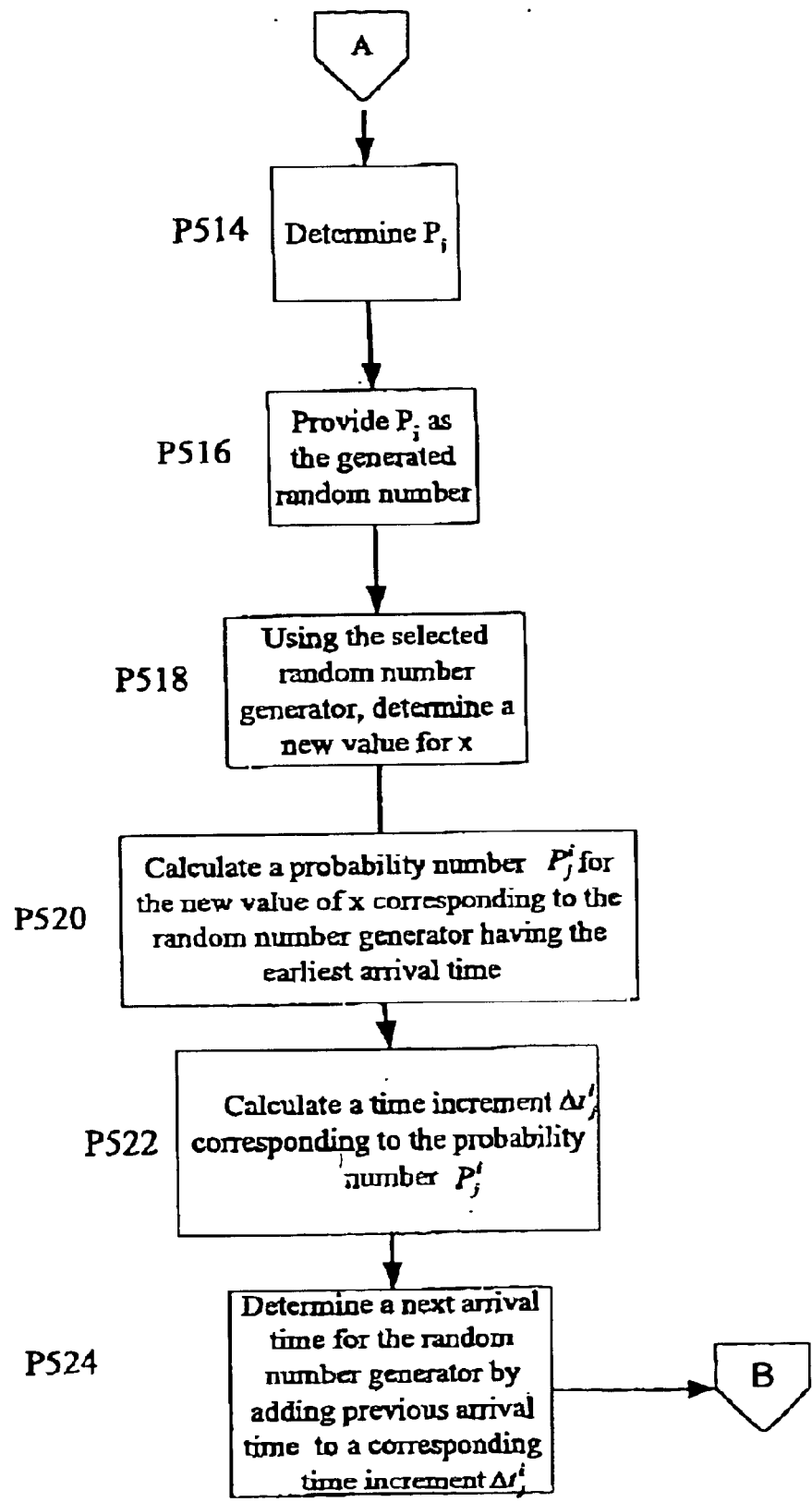

FIGS. 5A and 5B show a flowchart which helps to explain the processing which occurs in an embodiment of the invention. At P500, an arrival time associated with each of the random number generators is initialized to 0.

At P502, each of the n random number generators is used to calculate a respective value of x. For example, a linear congruential random-number generator, defined by $x_i=(ax_{i-1}+b)\text{modulo}(c+1)$, can be used to derive a next value of x. Note that the invention is not limited to being used only with linear congruential random-number generators, but may be used with a number of different random number generators.

At P504, for each value of x, a respective probability number, $P_j^i$ is calculated. The calculation can be determined by $$P_j^i = \frac{x+1}{c_i + 1}.$$

At P506, a time increment or inter-arrival time for each probability number $P_j^i$ is determined. This can be determined by calculating the time increment, $\Delta t_j^i$ as shown in equation 3.

At P508, a next arrival time for each of the random number generators is determined by adding the previous arrival time for a corresponding random number generator to a corresponding time increment or inter-arrival time $\Delta t_j^i$.

At P510 a determination is made as to which one of the random number generators has an earliest next arrival time. If more than one random number generator has the same arrival time, any of these generators can be selected first and the remaining generator(s) having the same arrival time may be processed in any order, but before other random number generators having later arrival times.

At P514, a probability, for example, $P_i$ is determined by the following formula:

$$P_i = e^{-\left(\sum_{j=1}^{n}\lambda_j\right)(t_i-t_{i-1})} \qquad [\text{EQUATION 7}]$$

where $P_i$ is the th probability generated for the CPRNG, $\lambda_j$ is the average inter-arrival rate for the $j^{th}$ random number generator and $t_i-t_{i-1}$ is the $(i^{th}-1)$ arrival time subtracted from the $i^{th}$ arrival time, which equals the $i^{th}$ inter-arrival time for the CPRNG.

At P516, the probability, for example, Pi is provided as the generated random number from the CPRNG. Thus, the generated random number is a value between 0 and 1. To produce a random number in a range, for example, 1 to 1000, the produced random number may be multiplied by 1000.

At P518, a new value of x is determined from the selected random number generator by using the selected random number generator to generate x. As mentioned above, the new value of x may be determined by using a linear congruential random-number generator or by using one of a number of different random-number generators.

At P520, a probability number, for example, $P_j^i$ is calculated by adding 1 to the new value of x and dividing that sum by $1+c_i$, as previously described.

At P522, a time increment or inter-arrival time $\Delta t_j^i$ corresponding to the probability number, for example, $P_j^i$ is calculated. This can be determined according to equation 3.

At P524, a next arrival time for the random number generator can be determined by adding the previous arrival time to the increment $\Delta t_j^i$ and saving the next arrival time corresponding to the random number generator.

Processes P510 through P524 continue to be repeated to generate each additional random number $P_i$.

The above-described calculations can be simplified by assuming that the average arrival rate for each of the PRNG's is equal to 1. That is, $\lambda$ corresponding to the average arrival rate for each of the PRNG's is equal to 1. Making such an assumption, equation 3 becomes:

$$\Delta t_j^i = -\ln(P_j^i) = -\ln\left(\frac{(x_j^i+1)}{(c^i+1)}\right) \qquad [\text{EQUATION 8}]$$

Further, equation 5 becomes:

$$P_i = e^{-n(t_i-t_{i-1})} \qquad [\text{EQUATION 9}]$$

where $t_i-t_{i-1}$ is a difference between a value of the time at an $i^{th}$ arrival time and a value of time at a $(i^{th}-1)$ arrival time and n is the number of random number generators.

Using the above simplified equations, new equation 8 can be used at P206 and P222, respectively, and new equation 9 can be used at P214.

In the embodiment shown in FIGS. 2 through 4, acts P504 and P520 are performed by the xconverter 302, acts P506 and P522 are performed by inter-arrival time calculator 304, acts P508 and P524 are performed by arrival time calculator 306, act P510 is performed by comparator 402 and acts P514 through P516 are performed by producer 404.

Figure 6:
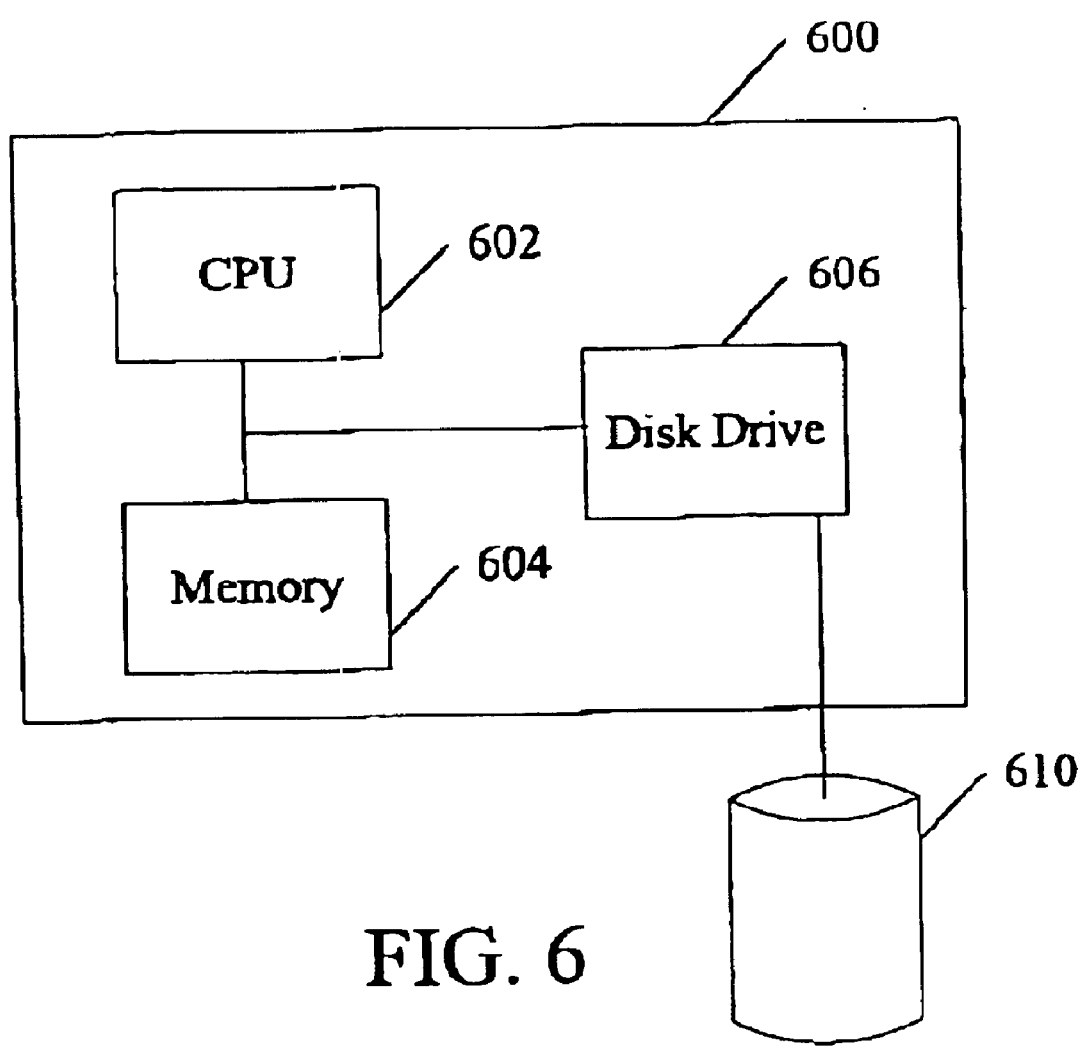
FIG. 6 shows an example of an apparatus for a combined random number generator.

FIG. 6 provides an example of an embodiment of an apparatus for generating random numbers. In this embodiment, the apparatus includes a computer 600. Computer 600 has a CPU 602 which communicates with a memory 604. The memory may be random access memory or a combination of random access memory and read-only memory. The computer may also include disk drive 606 and disk 610 which resides in disk drive 606. The disk may be a floppy disk, a hard disk or an optical disk. The disk may include instructions for the CPU 602 to perform as a CPRNG.

Computing a logarithm is typically a slow process on a computer. This can be substantially accelerated by previously generating a table of logarithms of integers. Therefore, the table can then be indexed by integer (x+1) and by integer ($c_i$+1) to form ln(x+1) and ln($c_i$+1). Since it is well known that $$\ln\left(\frac{a}{b}\right)$$

is equal to $$\ln(a) - \ln(b), \ -\ln\left(\frac{x+1}{c_i+1}\right)$$

can be derived by using the table to determine the value of ln($c_i$+1) and subtracting that value from ln(x+1) and changing the sign of the result.

When fewer random number generators are used, for example, less than 10, a linear search can be used to find an earliest next arrival time from among the arrival times corresponding to each random number generator.

However, when a larger number of random number generators are used, for example, 10 or more, a heap may be used to speed up the process of finding an earliest next arrival time from among the arrival times corresponding to each random number generator.

Embodiments of the invention may be implemented in hardware, software, or firmware. The firmware may be in a read-only memory and the software may reside on a medium such as a floppy disk, optical, disk, or CD ROM, for example.

While the invention has been described with reference to certain illustrated embodiments, the words which have been used herein are words of description, rather than words of limitation. Changes may be within the purview of the appended claims without departing from the scope and spirit of the invention in its aspects. Although the invention has been described herein with reference to particular structures, acts, and materials, the invention is not to be limited to the particulars disclosed but rather extends to all equivalent structures, acts, and materials, such as are within the scope of the appended claims.

I claim as my invention:

1. A computer-implemented method of generating random numbers using a plurality of random number generators, the method comprising:
   (1) generating a plurality of independent streams of events;
   (2) selecting an event from the independent streams based on an arrival time of the event in relation to arrival times of other events in the plurality of independent streams of events; and
   (3) using the selected event to generate a random number.

2. The computer-implemented method of claim 1, wherein act (2) comprises:
   (2a) determining an earliest arrival time from among arrival times associated with each of the plurality of independent streams; and (2b) selecting the event from a stream associated with the earliest arrival time.

3. The computer-implemented method of claim 2, further comprising:
(4) generating another event from one of the independent streams having the selected event;
(5) repeating acts 2 through 4 to produce successive random numbers.

4. A computer-implemented method of generating random numbers using a plurality of random number generators, the method comprising:
(1) using each of the random number generators to calculate a value of x for each of the random number generators;
(2) mapping each of the values of x to a respective time t for each of the random number generators;
(3) determining which one of the random number generators has the time t with a value being less than or equal to the respective time t of each of other ones of the random number generators; and
(4) generating, as output, a random number based on the lowest value of t determined in act (3).

5. The computer-implemented method of claim 4, further comprising:
(5) using the one random number generator determined in act (3) to calculate a new value of x;
(6) mapping the new value of x to a new value of t; and
(7) repeating acts 3 through 4 to generate another random number.

6. The computer-implemented method of claim 4, wherein act (2) comprises:
(a) converting the value of x to a probability number having a value between 0 and 1;
(b) determining a time increment $\Delta t^i$, based on the probability number; and
(c) determining the time t based on the time increment $\Delta t^i$, and a previous arrival time.

7. The computer-implemented method of claim 6, wherein act (a) comprises:
(a1) adding 1 to the value of x to produce a sum; and
(a2) dividing the sum by 1 plus a maximum value c which is generated by a corresponding one of the random number generators to produce the probability number.

8. The computer-implemented method of claim 6, wherein act (b) further comprises:
(b1) determining the time increment $\Delta t_j^i$ based on:

$$\Delta t_j^i = \frac{-\ln(P_j^i)}{\lambda_i},$$

where $P_j^i$ is the probability number and $\lambda_i$ is the average arrival rate for a corresponding one of the random number generators.

9. The computer-implemented method of claim 7, wherein act (b) further comprises:
(b1) determining the time increment $\Delta t_j^i$ based on:

$$\Delta t_j^i = \frac{-\ln(P_j^i)}{\lambda_i},$$

where $P_j^i$ is the probability number and $\lambda_i$ is the average arrival rate for a corresponding one of the random number generators.

10. The computer-implemented method of claim 6, wherein act (b) further comprises;
(b1) determining the time increment $\Delta t_j^i$ based on:
$\Delta t_j^i = -\ln(P_j^i)$, where $P_j^i$ is the probability number.

11. The computer-implemented method of claim 4, wherein act (4) comprises:
determining $P_i$ as the random number, wherein:
$P_i = e^{-n(t_i - t_{i-1})}$, where $P_i$ is the $i^{th}$ random number generated, n is a number of random number generators and $t_i - t_{i-1}$ is a difference between a value of the time t at an $i^{th}$ arrival time and a value of the time t at an ($i^{th}-1$) arrival time.

12. The computer-implemented method of claim 4, wherein act (4) comprises:
determining $P_i$ is the $i^{th}$ random number, wherein:

$$P_i = e^{-\left(\sum_{j=1}^{n} \lambda_j\right)(t_i - t_{i-1})},$$

where $P_i$ is the $i^{th}$ random number generated, $\lambda_j$ is an average arrival rate for the $j^{th}$ random number generator, where j will vary from 1 to n, n is a number of random number generators, and $t_i - t_{i-1}$ is a difference between a value of the time t at an $i^{th}$ arrival time and a value of the time t at an ($i^{th}-1$) arrival time.

13. An apparatus for generating random numbers comprising:
a plurality of random number generators;
a plurality of converters, each of the converters being configured to map a respective random number value of x, generated by each of the random number generators to a time t; and
a selector to determine which one of the random number generators has a lowest value for the time t, wherein:
the selector is arranged to generate a random number based on the lowest value for the time t.

14. The apparatus of claim 13, wherein each of the converters comprises:
an xconverter to convert the value of x to a probability number having a value between 0 and 1.

15. The apparatus of claim 14, wherein the xconverter is configured to add 1 to the value of x to produce a sum and the sum is divided by one plus a maximum value c to produce the probability number, wherein c is a maximum value generated by a corresponding one of the random number generators.

16. The apparatus of claim 14, wherein each of the converters further comprises an inter-arrival time calculator configured to receive the probability number from the Xconverter and determine a time increment $\Delta t_j^i$ based on:

$$\Delta t_j^i = \frac{-\ln(P_j^i)}{\lambda_i},$$

where $P_j^i$ is the probability number and $\lambda_i$ is the average arrival rate for a corresponding one of the random number generators.

17. The apparatus of claim 14, wherein each of the converters further comprises an inter-arrival time calculator configured to receive the probability number from the Xconverter and determine a time increment $\Delta t_j^i$ based on:
$\Delta t_j^i = -\ln(P_j^i)$, where $P_j^i$ is the probability number.

18. The apparatus of claim 16, wherein each of the converters further comprises an arrival time calculator that is configured to receive the time increment from the inter-arrival time calculator and determine a next arrival time based on the time increment.

19. The apparatus of claim 13, wherein the selector comprises a comparator to compare the arrival times associated with each of the random number generators and to select the arrival time having the lowest value.

20. The apparatus of claim 19, wherein the selector further comprises a producer to receive the arrival time having the lowest value and to generate a random number $P_i$, wherein:

$$P_i = e^{-\left(\sum_{j=1}^{n} \lambda_j\right)(t_i - t_{i-1})},$$

where $P_i$ is the $i_{th}$ random number generated, $\lambda_j$ is an average arrival rate for the $j^{th}$ random number generator, where j will vary from 1 to n, n being a number of random number generators, and $t_i - t_{i-1}$ is a difference between a value of the arrival time at an $i^{th}$ arrival time and a value of the arrival time at an $(i^{th}-1)$ arrival time.

21. A machine-readable medium having instructions recorded thereon, the instructions comprising:
    (1) generating a plurality of independent streams of events;
    (2) selecting an event from the independent streams based on an arrival time of the event in relation to arrival times of other events in the plurality of independent streams of events; and
    (3) using the selected event to generate a random number.

22. The machine-readable medium of claim 21, wherein act (2) comprises:
    (2a) determining an earliest arrival time from among arrival times associated with each of the plurality of independent streams; and
    (2b) selecting the event from a stream associated with the earliest arrival time.

23. The machine-readable medium of claim 22, further comprising:
    (4) generating another event on one of the independent streams having the selected event;
    (5) repeating acts 2 through 4 until a desired quantity of random numbers are produced.

24. A machine-readable medium having instructions recorded thereon, the instructions comprising:
    (1) using each of a plurality of random number generators to calculate respective random number values of x;
    (2) mapping each of the respective values of x to a respective time t for each of the random number generators;
    (3) determining which one of the random number generators has the time t with a value being less than or equal to the respective time t of each of other ones of the random number generators; and
    (4) generating, as output, a random number based on the lowest value oft determined in act (3).

25. The machine-readable medium of claim 24, further comprising:
    (5) using the one random number generator determined in act (3) to calculate a new value of x;
    (6) mapping the new value of x to a new value of t; and
    (7) repeating acts 3 through 4 to generate another random number.

26. The machine-readable medium of claim 24, wherein act (2) comprises:

(a) converting the value of x to a probability number having a value between 0 and 1;
(b) determining a time increment $\Delta t_j^i$ a based on the probability number; and
(c) determining the time t based on the time increment $\Delta t_j^i$ and a previous arrival time.

27. The machine-readable medium of claim 26, wherein act (a) comprises:
    (a1) adding 1 to the value of x to produce a sum; and
    (a2) dividing the sum by 1 plus a maximum value c which is generated by a corresponding one of the random number generators to produce the probability number.

28. The machine-readable medium of claim 26, wherein act (b) further comprises:
    (b1) determining the time increment $\Delta t_j^i$ based on:

$$\Delta t_j^i = \frac{-\ln(P_j^i)}{\lambda_i},$$

where $P_j^i$ is the probability number and $\lambda_i$ is the average arrival rate for a corresponding one of the random number generators.

29. The machine-readable medium of claim 27, wherein act (b) further comprises:
    (b1) determining the time increment $\Delta t_j^i$ based on:

$$\Delta t_j^i = \frac{-\ln(P_j^i)}{\lambda_i},$$

where $P_j^i$ is the probability number and $\lambda_i$ is the average arrival rate for a corresponding one of the random number generators.

30. The machine-readable medium of claim 26, wherein act (b) further comprises:
    (b1) determining the time increment $\Delta t_j^i$ based on:
    $\Delta t_j^i = -\ln(P_j^i)$, where $P_j^i$ is the probability number.

31. The machine-readable medium of claim 24, wherein act (4) comprises:
    determining $P_i$ as the random number, wherein:
    $P_i = e^{-n(t_i - t_{i-1})}$, where $P_i$ is the $i^{th}$ random number generated, n is a number of random number generators and $t_i - t_{i-1}$ is a difference between a value of the time t at an $i^{th}$ arrival time and a value of the time t at an $(i^{th}-1)$ arrival time.

32. The machine-readable medium of claim 24, wherein act (4) comprises:
    determining $P_i$ is the $i^{th}$ random number, wherein:

$$P_i = e^{-\left(\sum_{j=1}^{n} \lambda_j\right)(t_i - t_{i-1})},$$

where $P_i$ is the $i^{th}$ random number generated, $\lambda_j$ is an average arrival rate for the $j^{th}$ random number generator, where j will vary from 1 to n, n is a number of random number generators, and $t_i - t_{i-1}$ is a difference between a value of the time t at an $i^{th}$ arrival time and a value of the time t at an $(i^{th}-1)$ arrival time.

33. A computer-implemented method of generating random numbers using a plurality of random number generators, the method comprising:
    (1) calculating a random number value of x from each of a plurality of random number generators;
    (2) converting each of the values of x to a respective probability number according to a formula:

$$P_j^i = \frac{x+1}{c_i+1},$$

where $P_j^i$ is the respective probability number and $c_i$ is a maximum number which can be generated by a respective one of the random number generators;

(3) determining a respective time increment $\Delta t_j^i$ for each of the respective random number generators based on the respective probability number $P_j^i$ for each of the random number generators according to a formula:

$$\Delta t_j^i = \frac{-\ln(P_j^i)}{\lambda_i},$$

where $\lambda_i$ is the average arrival rate for an $i^{th}$ one of the random number generators;

(4) determining a respective arrival time t for each of the random number generators by adding a current time to the respective time increment $\Delta t_j^i$ to produce the respective arrival time t;

(5) determining which one of the random number generators has a smallest value of the arrival time t;

(6) generating a random number $P_i$ according to a formula:

$$P_i = e^{-\left(\sum_{j=1}^{n} \lambda_j\right)(t_i - t_{i-1})},$$

where $\lambda_j$ is an average arrival rate for the $j^{th}$ random number generator, where j will vary from 1 to n, n is a number of random number generators, and $t_1 - t_{i-1}$ is a difference between a value of the time t at an $i^{th}$ arrival time and a value of the time t at an ($i^{th}-1$) arrival time, where $t_i$ has the smallest value of the arrival time determined by act 5;

(7) determining a new value of x for the one of the random number generators;

(8) converting the new value of x to the respective probability number according to the formula:

$$P_j^i = \frac{x+1}{c_i+1},$$

where $P_j^i$ is the respective probability number and $c_i$ is maximum number which can be generated by the respective one of the random number generators;

(9) determining the respective time increment $\Delta t_j^i$ for the respective random number generator based on the respective probability number $P_j^i$ for the one of the random number generators according to the formula:

$$\Delta t_j^i = \frac{-\ln(P_j^i)}{\lambda_i},$$

where $\lambda_i$ is the average arrival rate for the respective random number generator;

(10) determining a respective arrival time t for the respective random number generator by adding the current time to the respective time increment $\Delta t_j^i$ to produce the respective arrival time t;

(11) repeating acts 5 through 10 to produce a next random number $P_j^i$.

34. The method of claim 33, wherein $\mu_i = 1$.

35. A machine-readable medium having instructions recorded thereon, the instructions comprising:

(1) calculating a random number value of x from each of a plurality of random number generators;

(2) converting each of the values of x to a respective probability number according to a formula:

$$P_j^i = \frac{x+1}{c_i+1},$$

where $P_j^i$ is the respective probability number and $c_i$ is a maximum number which can be generated by a respective one of the random number generators;

(3) determining a respective time increment $\Delta t_j^i$ for each of the respective random number generators based on the respective probability number $P_j^i$ for each of the random number generators according to a formula:

$$\Delta t_j^i = \frac{-\ln(P_j^i)}{\lambda_i},$$

where $\lambda_i$ is the average arrival rate for an $i^{th}$ one of the random number generators;

(4) determining a respective arrival time t for each of the random number generators by adding a current time to the respective time increment $\Delta t_j^i$ to produce the respective arrival time t;

(5) determining which one of the random number generators has a smallest value of the arrival time t;

(6) generating a random number $P_i$ according to a formula:

$$P_i = e^{-\left(\sum_{j=1}^{n} \lambda_j\right)(t_i - t_{i-1})},$$

where $\lambda_j$ is an average arrival rate for the $j^{th}$ random number generator, where j will vary from 1 to n, n is a number of random number generators, and $t_1 - t_{i-1}$ is a difference between a value of the time t at an $i^{th}$ arrival time and a value of the time t at an ($i^{th}-1$) arrival time, where $t_i$ has the smallest value of the arrival time determined by act 5;

(7) determining a new value of x for the one of the random number generators;

(8) converting the new value of x to the respective probability number according to the formula:

$$P_j^i = \frac{x+1}{c_i+1},$$

where $P_j^i$ is the respective probability number and $c_i$ is maximum number which can be generated by the respective one of the random number generators;

(9) determining the respective time increment $\Delta t_j^i$ for the respective random number generator based on the respective probability number Pn for the one of the random number generators according to the formula:

$$\Delta t_j^i = \frac{-\ln(P_j^i)}{\lambda_i},$$

where $\lambda_i$ is the average arrival rate for the respective random number generator;

(10) determining a respective arrival time t for the respective random number generator by adding the current time to the respective time increment $\Delta t_j^i$ to produce the respective arrival time t;

(11) repeating acts 5 through 10 to produce a next random number $P_{i+1}$.

36. The machine-readable medium of claim 35, wherein $\lambda_i=1$.

37. A computer-implemented method of generating random numbers using a plurality of independent event streams, the method comprising:

(1) selecting an event from the plurality of independent event streams based on an arrival time of a current event of each independent event stream; and (2) using the selected event to generate a random number.

38. The computer-implemented method of claim 37, wherein step (1) comprises:

(1a) determining an earliest arrival time from among arrival times associated with each of the current events corresponding to each of the plurality of independent event streams; and (1b) selecting the event from a stream associated with the earliest arrival time.

39. The computer-implemented method of claim 38, further comprising:

(3) generating another event by the independent stream having the selected event;

(4) repeating acts 1 through 3 to produce successive random numbers.

40. A machine-readable medium having instructions recorded thereon, the instructions comprising:

(1) selecting an event from a plurality of independent event streams based on an arrival time of a current event of each independent event stream; and (2) using the selected event to generate a random number.

41. The machine-readable medium of claim 40, wherein step (1) comprises:

(1a) determining an earliest arrival time from among arrival times associated with each of the current events corresponding to each of the plurality of independent event streams; and (1b) selecting an event from a stream associated with the earliest arrival time.

42. The machine-readable medium of claim 41, further comprising:

(3) generating another event by the independent stream having the selected event;

(4) repeating acts 1 through 3 until a desired quantity of random numbers are produced.

43. A computer-implemented method of generating random numbers using a plurality of random number generators, the method comprising:

(1) calculating a value by each of the plurality of random number generators;

(2) mapping each of the calculated values to a corresponding time value;

(3) determining a lowest time value from the set of time values mapped from each calculated value; and (4) generating a random number for output, based on the lowest time value.

44. The computer-implemented method of claim 43, further comprising:

(5) calculating a new value using a random number generator corresponding to the lowest time value;

(6) mapping the new value to a corresponding time value; and (7) repeating steps 3 through 4 to generate another random number.

45. The computer-implemented method of claim 43, wherein step (2) comprises:

(a) converting each calculated value to a probability number;

(b) for each probability number, determining a corresponding time increment based on the probability number; and (c) determining each corresponding time value based on the time increment and a previous arrival time.

46. The computer-implemented method of claim 43, wherein act (4) comprises:

determining $P_i$ as the random number, wherein:
$P_i = e^{-n(t_i - t_{i-1})}$, where $P_i$ is the $i^{th}$ random number generated, n is a number of random number generators and $t_i - t_{i-1}$ is a difference between a value of the time t at an $i^{th}$ arrival time and a value of the time t at an ($i^{th}-1$) arrival time.

47. The computer-implemented method of claim 43, wherein act (4) comprises:

determining $P_i$ as the random number, wherein:

$$P_i = e^{-(\sum_{j=1}^{n} \lambda_j)(t_i - t_{i-1})},$$

where $P_i$ is the $i^{th}$ random number generated, $\lambda_j$ is an average arrival rate for the $j^{th}$ random number generator, where j will vary from 1 to n, n is a number of random number generators, and $t_i - t_{i-1}$ is a difference between a value of the time t at an $i^{th}$ arrival time and a value of the time t at an $i^{th}-1$) arrival time.

48. An apparatus for generating random numbers comprising:

a plurality of random number generators;

a plurality of converters, each of the converters being configured to map a respective random number value, generated by each of the random number generators, to a time value; and a selector to determine which one of the random number generators has a lowest corresponding time value, wherein:

the selector is arranged to generate a random number based on the lowest time value.

49. A machine-readable medium having instructions recorded thereon, the instructions comprising:

(1) calculating a value by each of the plurality of random number generators;

(2) mapping each of the calculated values to a corresponding time value;

(3) determining a lowest time value from the set of time values mapped from each calculated value; and (4) generating a random number for output, based on the lowest time value.

50. The machine-readable medium of claim 49, further comprising instructions for:

(5) calculating a new value using a random number generator corresponding to the lowest time value;

(6) mapping the new value to a corresponding time value; and (7) repeating steps 3 through 4 to generate another random number.

51. The machine-readable medium of claim 49, wherein step (2) comprises:

(a) converting each calculated value to a probability number having a value between 0 and 1;

(b) determining a time increment $\Delta t_j^i$ based on the probability number; and (c) determining each time value based on the corresponding time increment $\Delta t_j^i$ and a previous arrival time.

52. The machine-readable medium of claim 51, wherein act (a) comprises:

(a1) adding 1 to each calculated value to produce a corresponding sum value; and (a2) dividing each sum value by 1 plus a maximum value which is generated by a corresponding one of the random number generators to produce the probability number.

53. The machine-readable medium of claim 51, wherein act (b) further comprises:

(b1) determining the time increment $\Delta t_j^i$ based on:

$$\Delta t_j^i = \frac{-\ln(P_j^i)}{\lambda_i},$$

where $P_j^i$ is the probability number and $\lambda_i$ is the average arrival rate for a corresponding one of the random number generators.

54. The machine-readable medium of claim 51, wherein act (b) further comprises:

(b1) determining the time increment $\Delta t_j^i$ based on: $\Delta t_j^i = -\ln(P_j^i)$, where is the probability number.

55. The machine-readable medium of claim 49, wherein step (4) comprises:

determining $P_i$ as the output random number, wherein: $P_i = e^{-n(t_i - t_{i-1})}$, where $P_i$ is the $i^{th}$ random number generated, n is a number of random number generators and $t_i - t_{i-1}$ is a difference between a time value at an $i^{th}$ arrival time and a time value at an ($i^{th}-1$) arrival time.

56. The machine-readable medium of claim 49, wherein step (4) comprises:

determining $P_i$ as the output random number, wherein:

$$P_i = e^{-\left(\sum_{j=1}^{n} \lambda_j\right)(t_i - t_{i-1})},$$

where $P_i$ is the $i^{th}$ random number generated, $\lambda_j$ is an average arrival rate for the $j^{th}$ random number generator, where j will vary from 1 to n, n is a number of random number generators, and $t_i - t_{i-1}$ is a difference between a time value at an $i^{th}$ arrival time and a time value at an ($i^{th}-1$) arrival time.

\* \* \* \* \*

UNITED STATES PATENT AND TRADEMARK OFFICE
CERTIFICATE OF CORRECTION

PATENT NO. : 6,792,439 B2
DATED : September 14, 2004
INVENTOR(S) : Douglas Charles Schmidt et al.

It is certified that error appears in the above-identified patent and that said Letters Patent is hereby corrected as shown below:

Column 7,
Line 23, please replace "oft" with -- of t --
Lines 36 and 38, please replace "$\Delta t^i$," with -- $\Delta t^i_j$ --

Column 9,
Line 14, please replace "$i_{th}$" with -- $i^{th}$ --
Line 58, please replace "oft" with -- of t --

Column 11,
Line 6, please replace "c," with -- $c_i$ --

Column 12,
Line 1, please replace "$\mu_i$" with -- $\lambda_i$ --
Line 14, Please replace "c," with -- $c_i$ --
Line 49, please replace "time" with -- time t --

Column 13,
Lines 6 and 7, 8 and 9, please replace "for the respective random number generator" with -- for the one of the random number generators --

Column 14,
Line 42, please replace "$i^{th}$-1)" with -- ($i^{th}$-1) --

Column 16,
Line 7, please replace "where is" with -- where $P^i_j$ is --

Signed and Sealed this

Twenty-eighth Day of June, 2005

JON W. DUDAS
*Director of the United States Patent and Trademark Office*